(12) United States Patent
Perron et al.

(10) Patent No.: US 9,423,316 B2
(45) Date of Patent: Aug. 23, 2016

(54) OPTICAL REFLECTOMETER WITH LOSS AND/OR REFLECTANCE PROFILE VIEW

(71) Applicant: EXFO Inc., Quebec (CA)

(72) Inventors: Stephane Perron, Ste-Hélène-de-Breakeyville (CA); Michel Leclerc, Quebec (CA)

(73) Assignee: EXFO Inc., Quebec (CA)

( * ) Notice: Subject to any disclaimer, the term of this patent is extended or adjusted under 35 U.S.C. 154(b) by 21 days.

(21) Appl. No.: 14/092,227

(22) Filed: Nov. 27, 2013

(65) Prior Publication Data

US 2014/0146312 A1 May 29, 2014

Related U.S. Application Data

(60) Provisional application No. 61/730,610, filed on Nov. 28, 2012.

(51) Int. Cl.
*G01N 21/00* (2006.01)
*G01M 11/00* (2006.01)

(52) U.S. Cl.
CPC ...... *G01M 11/3145* (2013.01); *G01M 11/3118* (2013.01)

(58) Field of Classification Search
CPC ......... G01M 11/00; H01J 14/00; G01N 21/88
See application file for complete search history.

(56) References Cited

U.S. PATENT DOCUMENTS

| 5,069,544 | A | 12/1991 | Buerli |
| 5,155,439 | A | 10/1992 | Holmbo et al. |
| 5,442,434 | A * | 8/1995 | Liao et al. ................. 356/73.1 |
| 5,528,356 | A | 6/1996 | Hacourt |
| 5,754,284 | A | 5/1998 | Leblanc |
| 7,515,276 | B2 | 4/2009 | Froggatt et al. |
| 8,576,389 | B2 | 11/2013 | Perron et al. |
| 2011/0149270 | A1 | 6/2011 | Nagel et al. |
| 2012/0045205 | A1 * | 2/2012 | Perron ........................ 398/48 |

OTHER PUBLICATIONS

J.A.Nagel et al., "Determination of Localized Loss in Cabled Fiber Using OTDR Measurements of Relative Mode Field Diameter", Proceedings of OFC/NFOEC, NWC3, 2010.
Park et al. "Coded Optical Time Domain Reflectometry: Principles and Applications", Proc. of SPIE vol. 6781, 678129, 2007.

\* cited by examiner

*Primary Examiner* — Tarifur Chowdhury
*Assistant Examiner* — Jamil Ahmed
(74) *Attorney, Agent, or Firm* — Helene Chotard

(57) ABSTRACT

There is provided an optical reflectometric method and system for characterizing an optical fiber link, wherein events in the fiber optic link under test are identified and values of parameters characterizing the events (e.g. location, insertion loss and reflectance) are extracted from an analysis of one or more reflectometric measurements performed on the optical fiber link. A loss profile and/or a reflectance profile are then constructed. The loss and reflectance profiles are typically displayed on screen or otherwise graphically represented for an operator to be able to appreciate the measurement results at a single glance.

27 Claims, 6 Drawing Sheets

OPTICAL REFLECTOMETER WITH LOSS AND/OR REFLECTANCE PROFILE VIEW

CROSS-REFERENCE TO RELATED APPLICATIONS

This application claims priority under 35 USC §119(e) of U.S. provisional patent application(s) 61/730,610 filed Nov. 28, 2012, the specification of which is hereby incorporated by reference.

TECHNICAL FIELD

The invention relates to the field of reflectometric methods used to characterize optical fibers and optical fiber links, and more specifically to the processing of data acquired using such methods.

BACKGROUND OF THE ART

Optical reflectometric methods are widely employed for characterization of optical fiber links. Among these methods, the most commonly used approach is Optical Time-Domain Reflectometry (OTDR—also used to refer to the corresponding device), a diagnostic technique where light pulses are launched in an optical fiber link and the returning light, arising from backscattering and reflections along the fiber link, is detected and analyzed. Various "events" along the fiber link can be detected and characterized through a proper analysis of the returning light in the time domain.

Most OTDRs provide an automatic mode, where the instrument automatically chooses an appropriate pulse duration (also referred to as "pulsewidth"), acquisition range and averaging time. In order to choose the appropriate settings for the final acquisition, the instrument launches one or many short "investigation acquisitions", which provide a quick overview of the link being tested. In general, the investigation acquisitions are hidden from the user, and only results from the final acquisition is made available.

For both manual settings and automatic settings, the final result is an OTDR trace performed with pulses having a common duration. In general, a given pulsewidth will be selected to allow characterization of the complete link. For example, a link having large loss requires testing with a long pulse. However, the use of a long pulse brings certain limitations in the ability to characterize short fiber sections, as well as closely spaced events.

An improvement to the single-pulsewidth approach has been developed, whereby the equipment makes use of successive acquisitions performed with increasingly longer pulses. Such an approach is the basis of the IntelliTrace Plus™ technology by Tektronix (http://www.tek.com, see also U.S. Pat. No. 5,155,439 (HOLMBO et al.) and U.S. Pat. No. 5,528,356 (HARCOURT)). The link under test is virtually split into segments, wherein each segment of the link is characterized using acquisition(s) performed with a given pulsewidth. Shorter pulses are used to characterize the most proximal segment, i.e. the near end of the link under test. A segment of the optical link that is farther away is then characterized using longer pulses. This acquisition process is repeated, each time using a different, generally longer, pulsewidth, until the end of the link is identified. It is to be noted that the number of different pulsewidths that are required depends on the link under test (normally only one pulsewidth for a short link, many pulsewidths for a long link). The pulsewidths of the successive acquisitions can be chosen in a dynamic manner, or using a "fixed recipe", that is, always testing with a given sequence of pulsewidths.

A difficulty arises when the results of such a multiple-pulsewidth acquisitions are to be graphically represented. Because most operators are accustomed to rely on an OTDR trace to interpret OTDR measurements and perform diagnosis, the display of a plurality of OTDR traces—obtained under different conditions—may give rise to confusion. Attempts have been made to solve this issue by combining the information obtained from the acquisitions taken under different pulsewidth conditions to yield a single result, wherein selected segments of the multiple OTDR traces are stitched together to construct a single synthetic OTDR trace (see U.S. Pat. No. 5,528,356 (HARCOURT)). Generation of this single synthetic OTDR trace requires processing of the multiple acquired OTDR traces.

The above multiple-pulsewidth approach offers significant improvement to the traditional single-pulsewidth approach, as each event can be characterized by an "optimum" pulsewidth. However, certain drawbacks remain. For example, the optimum pulse for measuring loss is not necessarily the same as the optimum pulse to measure reflectance or to perform event location. Moreover, situations exist where a single pulsewidth is insufficient to characterize an event.

A further improvement to the multiple-acquisition approach has been developed by EXFO and is commercialized as the Intelligent Optical Link Mapper (iOLM) (http://www.exfo.com, see also U.S. Pat. No. 8,576,389 (PERRON et al), commonly owned by the Applicant). This technology also uses acquisitions performed with pulses of various pulsewidths, but, in this case, the characterization of a single event may employ a combination of a plurality of acquisitions performed with different pulsewidths. For example, a first acquisition performed with one pulsewidth may be used to characterize the event location and a second acquisition performed with another pulsewidth may be used to characterize the insertion loss or the reflectance associated with this same event. Using this approach, the link under test generally cannot be split into aforementioned virtual segments associated with respective pulsewidths and it is not possible to construct a unique synthetic OTDR trace to graphically represent the OTDR measurement. Again, suitable graphical representation of the results is problematic.

Accordingly, the iOLM approach makes use of a table of events listing the events identified in the link under test with their respective parameters, as characterized in accordance with iOLM technology. A block diagram is also displayed showing a series of blocks each representing an event. This block diagram provides a simple global view of the link, and circumvents the need for the operator to carry out a complex interpretation of multiple OTDR traces. The operator clicks on the block corresponding to an event in order to have access to its respective parameters as characterized. However, using this approach, none of the OTDR traces could be used to graphically represent all the information that is being extracted from the iOLM analysis. In the context of link diagnosis, this approach lacks a proportionally scaled graphical representation of the backscattering/reflection level along the link under test.

In the case of OTDR measurements made with single-pulsewidth acquisitions, the interpretation of conventional OTDR traces typically displayed to the operator is complicated, requiring the operator to possess a level of skill more typical of a qualified technician. As OTDR measurements become more widely used in the optical telecommunication industry, the level of qualification of OTDR operators is likely to decline, rendering misinterpretations and wrong diagnoses more frequent and consequently increasing the time spent for completing service calls.

There is therefore a need for an improved processing of data obtained from OTDR measurements in general, and more specifically of multiple-acquisition OTDR measurements employing multiple pulsewidths.

SUMMARY

There is therefore provided a reflectometric method and apparatus for characterizing an optical fiber link wherein a new type of graphical representation is provided for an operator to readily interpret reflectometric measurement results. Events in the fiber-optic link under test are identified, and values of parameters characterizing the events (e.g. location, insertion loss and reflectance) are extracted from a proper analysis of one or more reflectometric measurements performed on the optical fiber link. A loss profile and/or a reflectance profile are then constructed, the loss profile representing a cumulated loss/attenuation of the optical fiber link as a function of distance and a reflectance profile representing localized reflectance values on the optical fiber link as a function of distance. The loss and reflectance profiles are typically displayed on screen or otherwise graphically represented for the operator to appreciate the measurement result at a single glance.

In accordance with one aspect, there is provided an optical reflectometric method for characterizing an optical fiber link comprising at least one optical fiber path. The method comprises:
- performing at least one light acquisition, wherein each light acquisition is performed by propagating at least one test light signal in the optical fiber link and detecting corresponding return light from the optical fiber link so as to obtain one or more reflectometric traces representing backscattered and reflected light as a function of distance;
- identifying at least one event in at least one of the obtained reflectometric traces;
- for each event, deriving values of parameters characterizing the event using at least one of said reflectometric traces, the parameters comprising a location of the event along the optical fiber link and at least one from the group consisting of an insertion loss and a reflectance associated with the event; and
- from the derived parameters, constructing at least one profile from the group consisting of a loss profile of the optical fiber link and a reflectance profile representing localized reflectance values, for graphical representation thereof.

In accordance with another aspect, there is provided an optical reflectometric system for characterizing an optical fiber link comprising at least one optical fiber path. The system comprises:
- a light generating assembly for generating and propagating at least one test light signal in the optical fiber link;
- a detection assembly for detecting return light from the optical fiber link for each test light signal so as to obtain one or more reflectometric traces representing backscattered and reflected light as a function of distance;
- an analyzing module for analyzing at least one of said reflectometric traces to identify therein at least one event and to derive, for each event, values of parameters characterizing the event, the parameters comprising a location of the event along the optical fiber link and at least one from the group consisting of an insertion loss and a reflectance associated with the event; and
- a profile generating module for constructing, from the derived parameters, at least one profile from the group consisting of a loss profile of the optical fiber link and a reflectance profile representing localized reflectance values, for graphical representation thereof.

The constructed loss and/or reflectance profiles are typically displayed on a screen and/or printed such that an operator of the OTDR may, at a single glance, have an overview of the entire optical fiber link as characterized without having to resort to complex cognitive interpretation of an OTDR trace. The operator has the loss profile and/or the reflectance profile readily available before him. In a conventional OTDR trace, the level of a reflection peak is not representative of the reflectance value associated with the event because 1) it is the height of the reflection peak relative to the backscattering level that is relevant; and 2) the height of the reflection peak is also dependent upon acquisition conditions, namely the pulsewidth and the optical power of the test light pulse used for the acquisition. Interpretation of a conventional OTDR trace requires knowledge of the acquisition conditions and complex interpretations that only highly qualified operators can accomplish. Contrary to conventional OTDR traces, the loss profile and/or reflectance profile are completely independent of the acquisition conditions and are thus readily interpreted.

Throughout this specification reference is made to optical reflectometric technology and more specifically to OTDR technology. It is noted that optical reflectometric technology is herein meant to encompass all variations of optical reflectometric methods that may be used to characterize optical fiber links and to which the methods and systems described herein may equivalently apply. Examples of such variations include Optical Frequency Domain Reflectometry (OFDR) (e.g., see U.S. Pat. No. 7,515,276 to FROGGATT et al), and coded OTDR technology (see Park et al. "Coded optical time domain reflectometry: principle and applications", Proc. of SPIE Vol. 6781, 678129 (2007)) also referred to as "correlation OTDR". In the case of conventional OTDR, measurements corresponding to different spatial resolutions may be obtained by varying the pulsewidth of the test light pulses, whereas in the case of OFDR, different spatial resolutions may be obtained by varying the frequency chirp of the OFDR test light signal. In the case of coded or correlation OTDR, it is the bit rate of the optical test pattern that determines the spatial resolution of the measurement.

In accordance with some embodiments, the light acquisitions are performed under different acquisition conditions wherein the corresponding test light pulses have different pulsewidths. A proper analysis of the multiple acquisitions allows identification of events along the optical link and values of parameters characterizing each identified event (position, insertion loss and reflectance) are derived using the multi-pulsewidth OTDR traces. These parameters are then used to construct loss and reflectance profiles as a function of distance along the optical link.

The constructed loss and reflectance profiles are typically displayed on a screen or otherwise plotted such that an operator of the OTDR may, at a single glance, have an overview of the entire optical fiber link as characterized without having to resort to complicated interpretation of a plurality of OTDR traces.

When none of the acquired OTDR traces allows for a complete visual representation of the entire optical fiber link, the constructed loss and reflectance profiles offer a readily interpreted graphical representation of the full characterization that is extracted from all, or at least a plurality, of the acquired OTDR traces.

In accordance with another aspect, there is provided an OTDR method for characterizing an optical fiber link. The method comprises:

performing a plurality of light acquisitions, wherein each light acquisition is performed by propagating one or more test light pulses in the optical fiber link and detecting corresponding return light from the optical fiber link as a function of time so as to obtain one or more OTDR traces representing the returning light as a function of distance on the optical fiber link;

from at least one of the obtained OTDR traces, identifying at least one event delimiting optical fiber segments in the optical fiber link;

for each event, deriving values of parameters characterizing the event using at least one of the OTDR traces, the parameters comprising a location of the event along the optical fiber link and an insertion loss associated with the event;

for each optical fiber section, deriving a value of a parameter characterizing the optical fiber section using at least one of the OTDR traces, the parameter comprising an attenuation associated with the optical fiber section; and from the derived parameters, constructing a loss profile of the optical fiber link representing a cumulated loss/attenuation of the optical fiber link as a function of distance thereon, for graphical representation thereof.

The constructed loss profile is typically displayed on a screen or otherwise plotted such that an operator of the OTDR may, at a single glance, have an overview of the entire optical fiber link as characterized without having to resort to complicated interpretation of a plurality of OTDR traces.

BRIEF DESCRIPTION OF THE DRAWINGS

It will be noted that throughout the appended drawings, like features are identified by like reference numerals.

DETAILED DESCRIPTION

Figure 1:
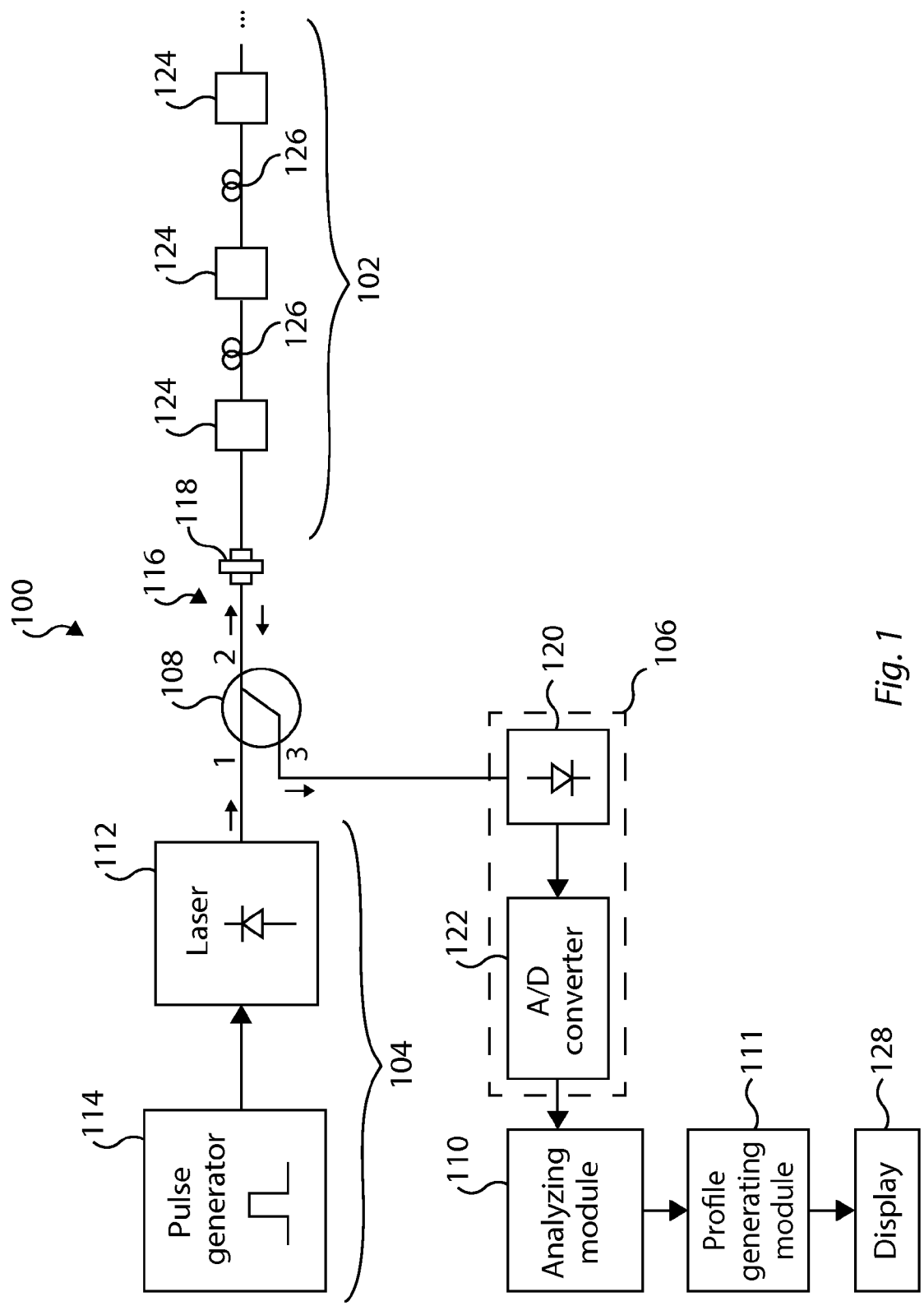
FIG. 1 is a block diagram of an OTDR device in accordance with one embodiment.

Referring to FIG. 1, there are provided Optical Time-Domain Reflectometric (OTDR) methods and systems for characterizing an optical fiber link. OTDR is a diagnostic technique for optical fiber networks where a light pulse is launched in an optical fiber link and the returning light, arising from backscattering and reflections along the fiber link, is detected and analyzed. Various events along the fiber link, which delimit optical fiber segments, can be detected and characterized through a proper analysis of the returning light in the time domain. FIG. 1 shows an example of an OTDR system 100 that may be used for performing OTDR measurements and OTDR methods as described herein, wherein FIG. 1 also shows an optical fiber link under test 102 that is connected to the OTDR system 100 for OTDR measurements to be performed.

The OTDR system 100 comprises a light generating assembly 104, a detection assembly 106, a directional coupler 108, an analyzing module 110 and a profile generating module 111. The light generating assembly 104, the detection assembly 706 and the directional coupler 708 are generally embodied in an OTDR acquisition device (not shown), while the analyzing module 110, the profile generating module 111 and the display 128 may be either be integral, partially external or totally external to the OTDR acquisition device. For example, the OTDR acquisition device may be a portable device that can be carried in field for testing optical fiber networks. The light generating assembly 104 is here embodied by a laser 112 driven by a pulse generator 114 to generate test light pulses having desired characteristics. As known in the art, the light generating assembly 104 is adapted to generate test light pulses of varied pulsewidths and optical power through a proper control of the pattern produced by the pulse generator 114. One skilled in the art will understand that, in addition, it may be beneficial or required by the application to perform OTDR measurements at two or more different wavelengths. For this purpose, in some embodiments, the light generating assembly 104 is adapted to generate test light pulses having varied wavelengths by employing a laser 112 that is tunable for example. It will be understood that the light generating assembly 104 may combine both pulsewidth and wavelength controlling capabilities. Of course, different and/or additional components may be provided in the light generating assembly, such as modulators, lenses, mirrors, optical filters, wavelength selectors and the like.

The light generating assembly 104 is coupled to the optical fiber link under test 102 through a directional coupler 108, such as a circulator having three or more ports. The first port is connected to the light generating assembly 104 to receive the test light pulses therefrom. The second port is connected to the output 116 of the OTDR system 100 which in turn is connected to the optical fiber link 102 typically through an optical connector 118. The third port is connected to the detecting module 106. The connections are such that test light pulses generated by the light generating assembly 104 are coupled to the optical fiber link 102 and that return light arising from backscattering and reflections along the fiber link is coupled to the detection assembly 106.

The detection assembly 106 comprises a light detector 120, for example an avalanche photodiode, which detects the return light signal corresponding to each test light pulse, and an A/D converter 122 to convert the analog electrical signal proportional to the detected return light signal to a digital representation in order to allow processing by the OTDR trace analyzing module 110. It will be understood that the detected return light signal may of course be amplified, filtered or otherwise processed before analog-to-digital conversion. The power level of return light signal as a function of time, which is obtained from the detection and conversion above, is referred to as one acquisition of an OTDR trace. An OTDR trace nominally corresponds to a single test light pulse but may also be obtained from averaging multiple acquisitions performed under the same conditions. Of course, the OTDR system 100 may also be used to perform multiple acquisitions with varied pulsewidths to obtain multi-pulsewidth OTDR traces. The thereby obtained OTDR traces typically will be stored in memory within the analyzing module 110 for further processing.

The analyzing module 110 and the profile generating module 111 may be embodied by hardware and software and, as mentioned hereinabove, may be integral, partially external or totally external to the OTDR acquisition device used to perform the acquisitions. In one embodiment, OTDR system 100 is embodied in a portable test instrument comprising computer architecture suitable for implementing the analyzing module 110 and the profile generating module 111. In another embodiment, the analyzing module 110 and the profile generating module 111 are implemented on computer architecture physically separate from the OTDR acquisition device. In this case, the OTDR traces acquired using the OTDR acquisition device may be stored or buffered and then transmitted or transferred to the analyzing module 110 for analysis.

The analyzing module 110 performs the calculations necessary to characterize the events 124 along the optical fiber link 102. In the illustrated embodiment, the hardware and software within the analyzing module 110 are also used to control the acquisition conditions for each light acquisition, by controlling the light generating assembly 104 to generate test light pulses having variable pulsewidths, wavelengths and/or optical power. It will however be understood that the control of the light generating assembly 104 may also be separate from the analyzing module 110.

The optical fiber link 102 typically comprises one or more events 124 located at undetermined positions along the fiber link 102 and delimiting optical fiber segments 126. The purpose of the analyzing module 110 is to identify the events 124 and characterize both the events 124 and the optical fiber segments 126 along the fiber link 120 through analysis of one or more OTDR traces. The analyses that may be conducted by the analyzing module 110 on multi-pulsewidth OTDR acquisitions are described hereinbelow. The events 124 are typically characterized in terms of location, insertion loss and reflectance parameters while optical fiber segments 126 are characterized in terms of an attenuation parameter. A list of the identified events and optical fiber segments, as well as the corresponding characterized parameters, is typically stored as an OTDR measurement file or table.

The profile generating module 111 constructs, from the parameters derived by the analyzing module, a loss profile and/or a reflectance profile of the optical fiber link, for graphical representation on the display 128 through graphical display on screen, for saving in memory, for printing or the like. As will be explained in more detail hereinafter, the loss profile represents a cumulated loss/attenuation of the optical fiber link and the reflectance profile represents localized reflectance values on the optical fiber link.

The optical fiber link under test may of course be one of several different types. For example, it may consist of a portion of an optical fiber telecommunication network such as a long-distance network, a Passive Optical Network (PON) or a Local Area Network (LAN). OTDRs may, however, also be used in other contexts, such as optical sub-assembly production testing and the like. It will be further understood by one skilled in the art that while the examples below are given within the simplified context of a single fiber link, embodiments of the present invention may be adapted to point-to-multipoint networks, for example combined with High Reflectance Demarcation (HRD) techniques in Passive Optical Networks (PONs) (see, for example, patent publication no. US 2012/0045205 A1 to PERRON, commonly owned by the applicant).

It will be readily understood that several variants of OTDR exist and may be devised, and that the use of this designation herein in not meant to limit the scope of the present specification to any of such variants. One skilled in the art will also understand that other optical components may be added to the OTDR system 100 for referencing purposes for example. A reference fiber may be added between the output of the OTDR acquisition device and the input of the optical fiber link under test. Also, in some embodiments (not illustrated), an internal reference reflector may be connected to a fourth port of the directional coupler 108. This reference reflector allows fluctuations in OTDR power levels due to aging or thermal effects to be tracked and compensated by performing normalization between acquisitions, thereby providing more accurate measurements (see U.S. Pat. No. 5,754,284 (LEBLANC et al.), commonly owned by the applicant).

Figure 2:
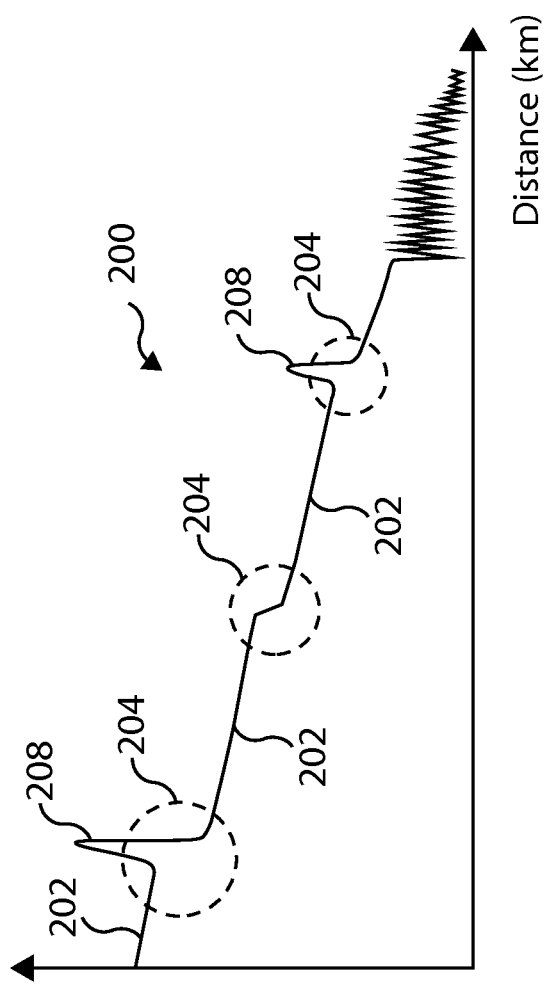
FIG. 2 is a graph showing a typical single-pulse OTDR trace as acquired on a optical fiber link under test using an OTDR device.

Referring to FIG. 2, the test light pulse signal travelling along the optical fiber link will return towards its point of origin either through backscattering or reflection. The acquisition of the return light signal as a function of time is referred to as the OTDR trace, where the time scale is representative of distance between the OTDR system and a point along the fiber link. FIG. 2 shows an example of such an OTDR trace 200 obtained using a pulsewidth of 1 μs.

"Backscattering" refers to backward-propagating (i.e. towards the OTDR system) Rayleigh scattering 202 occurring from the interaction of the forward propagating light with the optical fiber medium all along the fiber link. This gives rise to a generally sloped background light (in logarithmic units, i.e. dB, on the ordinate) on the OTDR trace 200, whose intensity disappears at the end of the range of the travelling pulse. Events 204 along the fiber will generally result in a more localized change in the level of backscattered light on the OTDR trace 200 and/or in a localized reflection peak 208. It will be understood that an "event" characterized by the OTDR method described herein may be generated by any perturbation along the fiber link which affects the returning light. For example, an event may be generated by an optical fiber splice along the fiber link, which is characterized by a localized loss with little or no reflection. Mating connectors may also generate events which typically present reflectance, although these may be impossible to detect in some instances. A connection between optical fiber segments having different optical properties (i.e. having different Mode-Field Diameters (MFD)) may also generate an event characterized by a localized drop or step in the backscattered light, notwithstanding the localized loss and/or reflection caused by the connection (i.e. splice or mating connector). OTDR methods and systems may also provide for the identification of events such as a fiber breakage, characterized by substantial localized loss and, frequently, a concomitant reflection peak, as well as loss resulting from a bend in the fiber. Finally, other components along the fiber link, for example splitters and the like, may also generate "events" characterized by localized loss.

Figure 3:
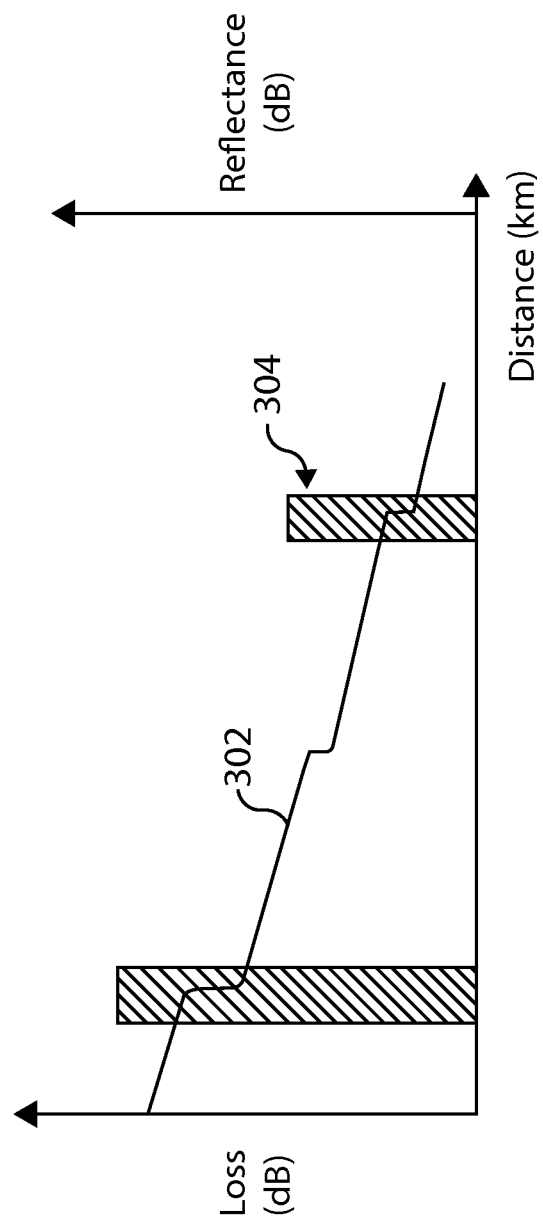
FIG. 3 is a graph showing a loss and a reflectance profile as corresponding to the OTDR trace of FIG. 2.

Now referring to FIGS. 2 and 3, there is also provided an OTDR method for characterizing an optical fiber link. Of course, the OTDR method may be embodied using the OTDR system 100 described hereinabove but variations and other systems may be used as well.

In accordance with the OTDR method, one or more light acquisitions of the backreflected/backscattered light are first performed. Each light acquisition is understood to refer to the actions of propagating one or more test light pulses in the optical fiber link and detecting corresponding return light signal from the optical fiber link as a function of time. The power level of the return light signal as a function of time is referred to as an OTDR trace 200. Light acquisitions may be performed by employing, for example, the light generating assembly 104 and the detection assembly 106 of the system 100 of FIG. 1.

One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging will herein be referred to as an OTDR trace 200. Furthermore, the present method may involve performing additional light acquisitions under given acquisition conditions without departing from the scope of the present application. For example, one embodiment of the method may involve two or three different acquisition conditions, and be carried out by performing several light acquisitions for each acquisition condition. It will also be understood that other factors may need to be controlled during the light acquisitions or from one light acquisition to the next, such as gain settings, pulse power, etc. as is well known to those skilled in the art.

It will be understood that the method may further involve performing multiple light acquisitions under mutually different acquisition conditions, by varying, for example, the pulsewidth of the test light pulses from one acquisition to the other. The result would be multiple OTDR traces acquired with mutually different acquisition conditions. This can be done, for example, by employing the light generating assembly 104 of the system 100 of FIG. 1. However, multiple acquisitions may not be necessary depending on the specific application. Accordingly, the example method described in reference to FIGS. 2 and 3 makes use of a single OTDR trace but it will be understood that the described method may also be applied in cases of multiple acquisition OTDR methods.

The OTDR method further comprises identifying the events 204 within the OTDR trace 200, the events 204 also delimiting optical fiber segments 202 on the optical fiber link. Identification of the events may be made according to their locations, i.e. the distance along the optical fiber link at which the event is identified. This step may be embodied, for example, in the analyzing module 110 of the system 100 of FIG. 1.

It is common in the art to identify events on an OTDR trace 200 by analyzing the OTDR trace 200 to identify a localized drop in the backreflected/backscattered light and/or a reflection peak. The presence of one or the other will generally be interpreted as an event.

It is also common in the art to characterize events 204 along an optical fiber link by attributing values to three different parameters: the location of the event along the optical fiber link, the insertion loss associated with the event and the reflectance at the event (when present). Depending on the circumstances, one or a combination of a plurality of these parameters may be evaluated for a given event. In the embodiment described herein, all three parameters are evaluated in this step, for each identified event. It is also common to characterize optical fiber segments 202 between the identified events 204 by attributing a value of an attenuation parameter thereto.

The OTDR method hence further derives values of the parameters used to characterize each event and optical fiber segments from an analysis of the OTDR trace 200. This step may be embodied, for example, in the analyzing module 110 of the system 100 of FIG. 1.

Knowing the specific acquisition conditions, the value of insertion loss corresponding to the event may be derived from the associated drop in the backscattered light, between respective points just "upstream" and "downstream" of the event on the OTDR trace. Also with knowledge of the specific acquisition conditions including the pulsewidth(s) of the test light pulse(s) used for the acquisition, the value of the reflectance corresponding to the event may be derived from the height 6 of the associated reflection peak with respect to the level of backscattered light:

Reflection $(dB) = -\sigma(\Delta t) + 10 \log_{10}(10^{0.2\delta} - 1)$ where $\sigma(\Delta t)$ is a nominal backscattering coefficient (in dB units) associated with optical fibers and is a function of the pulsewidth $\Delta t$.

Furthermore, for each optical fiber segment 202, the value of attenuation corresponding to the optical fiber segment 202 may be derived from the rate of change of the backscattered light on the portion of the OTDR trace 200 corresponding to the given optical fiber segment 202. This value is typically obtained by performing a least squares fit on the relevant portion of backscattered light.

The result of this analysis is a list of identified events and optical fiber segments, as well as the corresponding characterized parameters, which may be stored as an OTDR measurement file or table. This list may optionally be displayed on a screen or be otherwise graphically presented. Table 1 below shows an example of a table generated from the list of events and optical fiber segments, which lists all the identified events and optical fiber segments, as well as their corresponding parameters. The events are interleaved with values of attenuation corresponding to the optical fiber segments in-between the events.

TABLE 1

| | Location (m) | Insertion loss (dB) | Reflectance (dB) | Attenuation (dB/km) |
|---|---|---|---|---|
| | | | | 0.15 |
| Event A | 1000 | 1 | −50 | |
| | | | | 0.15 |
| Event B | 2000 | 0.5 | −120 | |
| | | | | 0.15 |
| Event C | 3000 | 0.75 | −70 | |

The OTDR method further comprises constructing a loss profile and/or a reflectance profile of the optical fiber link as characterized, from the parameters derived above by a proper analysis of the OTDR trace 200. FIG. 3 shows a graphical representation of the loss profile 302 and the reflectance profile 304 as constructed from Table 1. This step may be embodied, for example, in the profile generating module 111 of the system 100 of FIG. 1.

The loss profile is meant to represent a cumulated loss/attenuation of the optical fiber link as a function of distance therealong and is synthesized using the data presented in the list of events and optical fiber segments. For example, consider a list comprising optical fiber segments $S_{01}$ and $S_{12}$, having respective values of attenuation (in dB units) of $A_{01}$ and $A_{12}$, which are interleaved with events $E_1$ and $E_2$ respectively located at $x_1$ and $x_2$, having respective values of insertion loss (in dB units) of $IL_1$ and $IL_2$. The loss profile as a function of the distance x, from the beginning of the optical fiber link to event $E_1$ is then given by:

$$\text{Loss(dB)} = -A_{01} \cdot x, \text{ for } x < x_1$$

The loss profile would drop of $IL_1$ at $x_1$, and is given as follows between events $E_1$ and $E_2$:

$$\text{Loss(dB)} = -A_{01} \cdot x_1 - IL_1 - A_{12} \cdot (x - x_1), \text{ for } x_1 < x < x_2$$

and so on.

Similarly, the reflectance profile is meant to represent localized reflectance values on the optical fiber link as a function of distance therealong and is synthesized using the data presented in the list. The reflectance profile is presented in FIG. 3 using a bar graph wherein the height of vertical bars represent the reflectance value (in dB) corresponding to the distance x along the optical fiber link. A bar is shown for each event in the list but the value of reflectance may be null or negligible for some non-reflective events, resulting in a small or missing bar.

As will be appreciated, interpretation of the OTDR measurement by the operator (or any other individual involved either in the measurement procedure or subsequent post-measurement analysis) is greatly facilitated by the graphical representation of the loss and/or reflectance profiles. Graphical representations of the constructed loss and/or reflectance profiles are typically displayed on a screen and/or printed. Even though the information presented in the loss and reflectance profiles are indirectly available to a skilled operator on the OTDR trace 200 of FIG. 2, interpretation of OTDR traces, especially reflectance interpretation, requires a deep understanding of OTDR technology, as well as interpretation as a function of the acquisition conditions, namely the pulsewidth and the optical power of the test light pulse used for the acquisition. The loss and reflectance profiles as described herein provide to the operator of the OTDR an overall view of the entire optical fiber link as characterized without having to resort to complicated interpretation of an OTDR trace. Contrary to conventional OTDR traces, the loss profile and/or reflectance profile are independent of the acquisition conditions and are thus readily interpreted for the operator to appreciate the measurement results.

It will be appreciated that the above-described OTDR method can be further advantageously used in the case of multi-pulsewidth acquisitions, where acquisitions are performed with respective test light pulses of different pulsewidths. A plurality of OTDR traces is thereby obtained, where each OTDR trace corresponds to a respective pulsewidth.

Figure 4:
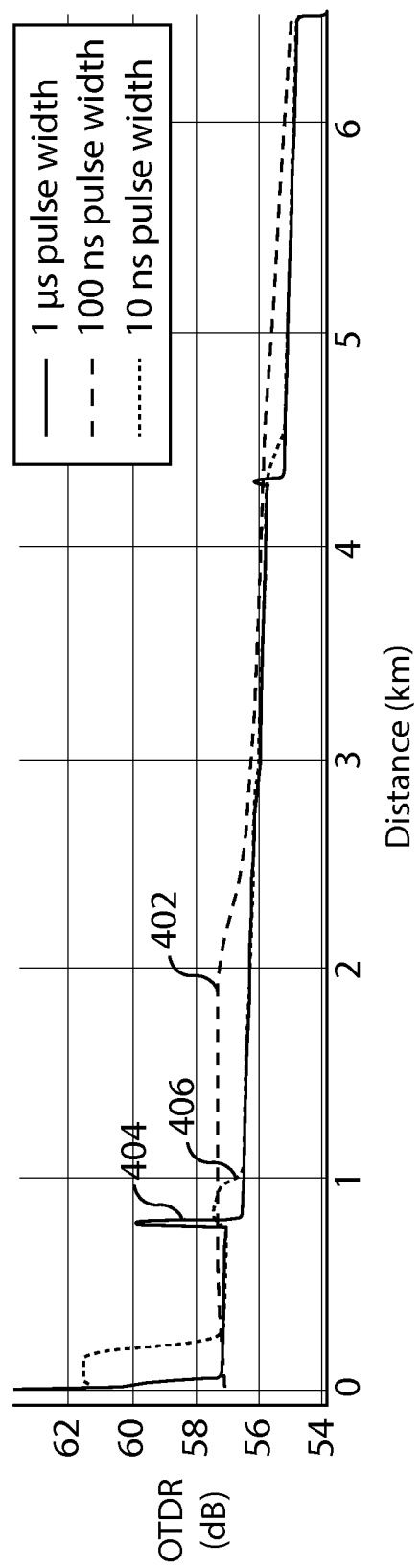
FIG. 4 is a graph showing typical multi-pulsewidth OTDR traces as acquired on a optical fiber link under test using an OTDR device.

FIG. 4 shows an example of such multi-pulsewidth OTDR traces corresponding to multi-pulsewidth acquisitions performed on an optical fiber link under test, wherein OTDR trace 402 is obtained using a pulsewidth of 1 μs, OTDR trace 404 is obtained using a pulsewidth of 10 ns and wherein OTDR trace 406 is obtained using a pulsewidth of 100 ns. Again, the acquisitions may be performed, for example, by employing the light generating assembly 104 and the detection assembly 106 of the system 100 of FIG. 1.

A proper analysis of the multiple acquisitions allows identification of events along the fiber link and values of parameters characterizing each identified event (location, insertion loss and reflectance) are derived using the multi-pulsewidth OTDR traces. Values of parameters characterizing optical fiber segments lying between the identified events are also derived using the multi-pulsewidth OTDR traces.

In some embodiments employing multi-pulsewidth acquisitions, the optical fiber link is virtually split in length such that each portion of the fiber link is characterized using a corresponding acquisition performed with a given pulsewidth. Shorter pulses are used to characterize the most proximal portion, i.e. the near end of the link under test. A second acquisition with a longer pulse is then performed, to characterize the portion of the optical link that is farther away. This process of acquisition with a progressively longer pulse is repeated until the end of the link is attained (or, for a very long link, the farthest distance for which a meaningful signal still may be acquired). It is to be noted that the number of different acquisitions that is used depends on the link under test (e.g. only one pulsewidth for a short link, many acquisitions with different pulsewidths for a long link). As a result, parameters of at least some events are derived from an OTDR trace corresponding to one pulsewidth and parameters of some other events are derived from another OTDR trace corresponding to different pulsewidth. The successive acquisitions can be performed in a dynamic manner, i.e. optimized during measurement of the particular link under test, or based on a predetermined routine that always tests with a given sequence of pulsewidths. In practice, differences in gain settings, filtering, bandwidth, etc. may occur for each acquisition. The parameters so-obtained are then used to construct the loss and/or the reflectance profile as a function of distance along the optical link.

In accordance with some other embodiments employing the multiple-acquisition approach, an optimum pulse for characterizing a particular event or optical fiber segment is selected independently for each parameter to be characterized, such that the characterization of a single event may use a combination of a plurality of acquisitions performed with different pulsewidths. For example, a first acquisition performed with one pulsewidth may be used to characterize the event location and a second acquisition performed with another pulsewidth may be used to characterize the insertion loss or the reflectance associated with this same event.

Hence, in accordance with such embodiments, values of parameters of each event identified along the optical fiber link are derived from a proper analysis of the OTDR traces such that the optimum OTDR trace to be used for deriving each parameter of each event is selected independently. Accordingly, for each event and for each parameter to be characterized, the optimum OTDR trace to be used for deriving the parameter is selected. Hence, instead of selecting the optimum pulse for each event, the method and system combine the OTDR traces obtained with multiple pulsewidths to extract as much information as practicable about each event.

In some embodiments, the selection may be based on quality factors associated to each OTDR trace for a given parameter of a given event. The OTDR method may therefore involve associating a "quality factor" to the parameters being evaluated for each of the OTDR trace. This quality factor may enable comparison of the results from different light acquisitions. Quality factors are usually based on one or many of the following considerations: pulsewidth, SNR, sampling resolution, etc. Quality factors can also vary based on the type of event that is looked at (reflective vs. non-reflective, small vs. large loss).

Some simple quality factors are given here as illustrative examples:

Loss: the shortest pulse acquisition that provides a signal-to-noise ratio (SNR) above a predetermined loss threshold, for example 10 dB;

Location: the acquisition that provides the smallest sampling resolution with an SNR above a predetermined location threshold, for example 8 dB. In general, the smallest sampling resolutions are associated with the shortest pulse acquisitions;

Reflectance: the shortest pulse acquisition that provides an SNR above a predetermined reflectance threshold, for example 7 dB.

In general, for reflective events, the thresholds for location and reflectance are of a smaller value than the threshold for loss. The chosen threshold values for SNR depend on the application and on the accuracy that is required. These examples of quality criteria are given for illustrative purposes and are not to be considered limitative to the scope of the invention.

It is noted that, in some embodiments, a combination of OTDR traces may also be used to characterize a single parameter of an event.

Similarly, values of attenuation parameters of the optical fiber segments are derived from a proper analysis of one or more OTDR traces. The attenuation parameter is typically derived from the rate of change (in dB/km) of a least-square fit performed on a portion of the OTDR trace corresponding to the optical fiber segment for which the attenuation parameter is being evaluated. The optimum OTDR trace to be used for deriving the attenuation parameter of an optical fiber segment may also be selected based on a quality factor. The OTDR method may then involve associating a quality factor to the attenuation parameter to be evaluated on a given optical fiber segment for each OTDR trace. An example of a quality factor may be:

Attenuation: the acquisition for which a least-square fit performed to evaluate the attenuation parameter provides the lowest root-mean-square error.

The reader is being referred to International Publication No. WO 2011/147030 A1 (PERRON et al), which is hereby incorporated by reference, for further implementation details of specific embodiments of multiple-acquisition OTDR methods and systems.

The identified events and the derived parameters characterizing the events and the optical fiber segments may also here be presented as a list. Table 2 below shows an example of a table generated from the list of events and optical fiber segments identified using the OTDR traces of FIG. 4. Table 2 lists all the identified events and their corresponding parameters. The events are interleaved with values of attenuation corresponding to the optical fiber segments between the listed events.

TABLE 2

| | Location (m) | Insertion loss (dB) | Reflectance (dB) | Attenuation (dB/km) |
|---|---|---|---|---|
| Event A | 0 | n/a | −50 | |
| | | | | 0.15 |
| Event B | 5 000 | 0.5 | −45 | |
| | | | | 0.15 |
| Event C | 11 000 | 0.75 | −50 | |
| | | | | 0.15 |
| Event D | 24 000 | 8 | −10 | |
| | | | | 0.15 |
| Event E | 41 000 | 0.5 | −65 | |
| | | | | 0.15 |
| Event F | 44 000 | 0.5 | −50 | |
| | | | | 0.15 |
| Event G | 50 000 | n/a | −45 | |

Figure 5:
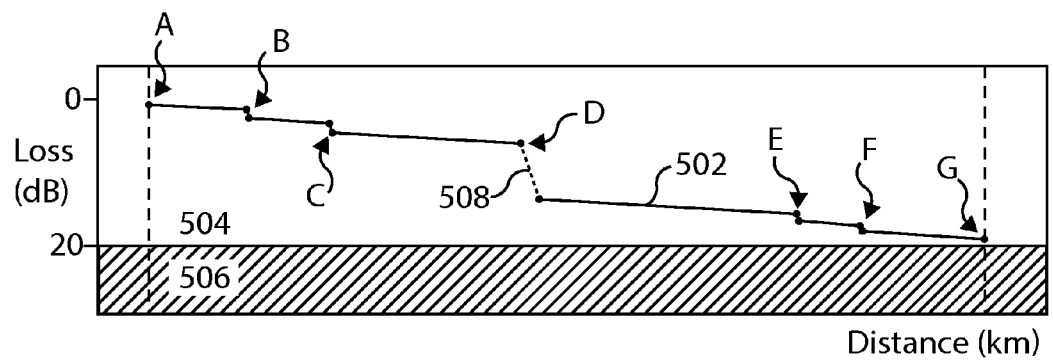
FIG. 5 is a graph showing a loss profile corresponding to the OTDR traces of FIG. 3.
Figure 6:
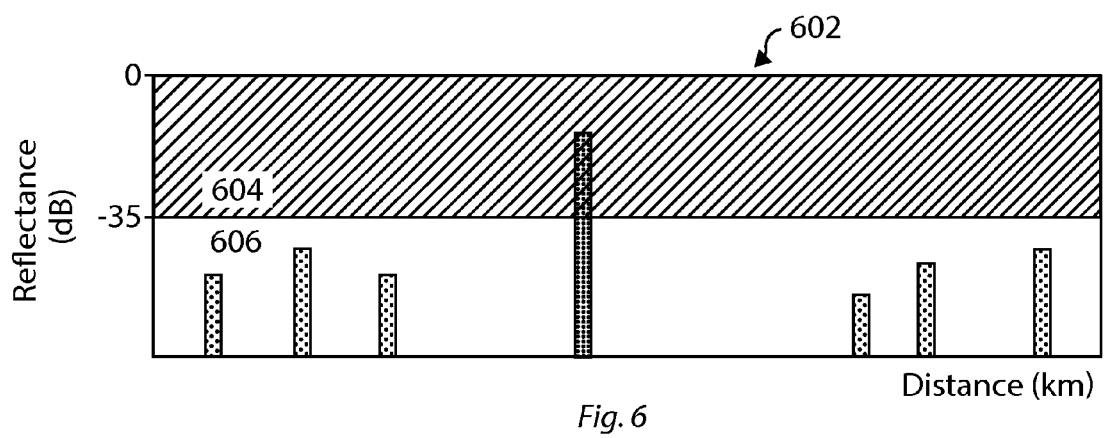
FIG. 6 is a graph showing a reflectance profile corresponding to the OTDR traces of FIG. 3.

In accordance with the OTDR method, the loss profile and/or the reflectance profile of the optical fiber link as characterized are constructed from the parameters derived above. FIGS. 5 and 6 respectively show graphical representations of the loss profile 502 and the reflectance profile 602 as constructed from Table 2.

The constructed loss and reflectance profiles as obtained from the OTDR method provided herein advantageously offer a readily interpretable graphical representation of the full characterization that is extracted from all the acquired OTDR traces.

FIG. 5 shows a graphical representation of the loss profile 502 in accordance with one exemplary embodiment. The graphical representation of FIG. 5 comprises a Cartesian graph for which the abscissa (horizontal axis) represents the distance x along the optical fiber link and the ordinate (vertical axis) represents the cumulated loss/attenuation along the optical fiber link as a function of distance. In this embodiment, the loss profile 502 is plotted as a line graph where values on the ordinate axis are shown in decibels (dB). The scale of the ordinate is reversed in that, as the cumulated loss/attenuation increases along the fiber link, points appear to go down on the graph. Of course, although this representation is more intuitive, it is not necessary and, in other embodiments, the graph could be presented without reversal of the ordinate.

In this embodiment, the graph is divided along the ordinate into zones 504, 506 that represent a particular, generally predetermined, pass/fail threshold applicable to the cumulated loss/attenuation values. The pass zone 504 corresponds to the area in the graph for which the cumulated loss/attenuation values remain within the predetermined maximum acceptable cumulative loss on the fiber link, in accordance with a given pass/fail threshold which is set to 20 dB is this illustrated case. The fail zone 506 corresponds to the area in the graph where the cumulative loss values are above the pass/fail threshold.

As will be understood by those skilled in the art, the duration of the pulses used for the acquisition creates "dead zones" in OTDR traces following a reflective event, causes some backscattering information to be "hidden" under the optical pulse as reflected by this reflective event. Because of such dead zones, insertion loss of an event is evaluated based on the drop in the OTDR trace level just before and after the dead zone. Insertion loss is therefore not perfectly localized. The dead zones may be illustrated in the loss profile 502. For example, in the embodiment of FIG. 5, the dead zones are depicted using dotted-line segments 508 in the loss profile to represent portions in the graph where the loss profile 502 cannot be evaluated. Of course, one may decide to ignore dead zones when constructing the loss profile 502.

FIG. 6 shows a graphical representation of the reflectance profile 602 in accordance with one exemplary embodiment. The graphical representation of FIG. 6 also comprises a Cartesian graph wherein the abscissa represents the distance x along the optical fiber link and the ordinate represents localized reflectance values along the optical fiber link. In this embodiment, the reflectance profile 602 is plotted as a bar graph where the height of a vertical bar represents the reflectance value in decibels (dB).

The reflectance graph is also divided into zones 604, 606 that represent a pass/fail threshold applicable to the localized reflectance values. The pass zone 604 corresponds to the area in the graph for which the plotted reflectance value is within the maximum acceptable reflectance for a single event, that is −35 dB is this illustrated case. The fail zone 606 corresponds to the area in the graph where the reflectance value is above the pass/fail threshold. As shown in FIG. 6, event D exhibits a reflectance of −10 dB, which is above the acceptable threshold. In some embodiments, a special color, such as red, or another visual characteristic may be given to the bar of a reflectance that is above the threshold.

Figure 7:
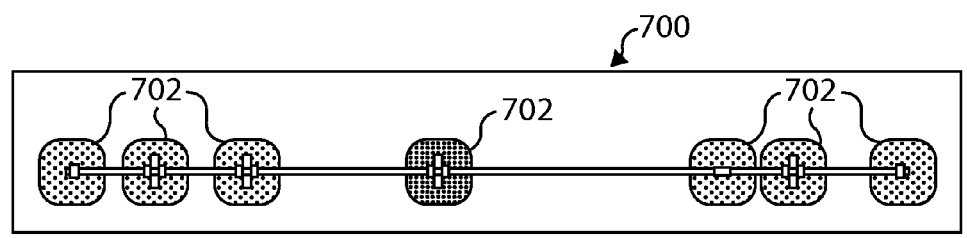
FIG. 7 is graphical representation showing a link element view corresponding to the OTDR traces of FIG. 3.

FIG. 7 shows a graphical representation of the fiber link under test in the form of a block diagram constructed from the list of events and optical fiber segments of Table 2. This graphical representation is referred to as a "link element view" 700. Each event of the list is represented by an icon 702, whose image corresponds to the type of event identified. Accordingly, each icon 702 is selected among a number of visually-distinct icons, so as to facilitate identification of the various types of events that may be part of an optical fiber link. Again, in some embodiments, a special color, such as red, or any other visual characteristic, may be assigned to an icon associated with an event having a reflectance or an insertion loss exceeding the pass/fail threshold.

As known in the art, OTDR measurements are often performed with the aid of a launch and a receive cable. The optical fiber link represented in FIGS. 5 to 7 comprises such a launch cable between event A and B and a receive cable between event F and G. It should however be understood that the relevant information regarding the optical fiber link lies in-between the launch and receive cables. Accordingly, in some embodiments, the portions of the optical fiber link that correspond to the launch and receive cables are omitted from the loss and reflectance profiles. It is also noted that in some circumstances, the loss and reflectance profiles could be constructed for only a portion of the optical fiber link under test. The expression "optical fiber link" may therefore refer herein to either the entire optical fiber link or to a portion thereof that is being characterized.

It is known in the art that intrinsic optical fiber attenuation, as well as that caused by fiber bending, varies with wavelength. It is therefore common in the art to perform OTDR acquisitions at multiple wavelengths in order to fully characterize an optical fiber link. It should be appreciated that the herein-described OTDR method may further involve repeating the single-pulsewidth or multiple-pulsewidth characterization of the optical fiber link with test light pulses of varied wavelength. In this case, a loss and a reflectance profile is constructed for each characterization wavelength. The multiple loss profiles may be presented concomitantly, typically on a same graph, for the operator to appreciate the wavelength-dependant variation of the loss profile at a single glance. Of course, the multiple reflectance profiles may also be presented, on the same or another graph.

Multiple-wavelength acquisitions may be advantageously useful in circumstances where highly wavelength-dependent devices, such as High Reflectance Demarcation (HRD) components used in Passive Optical Networks (PONs), are to be identified. Such devices would generate an event that reveals itself by highly wavelength-dependent loss and/or reflectance profiles.

It will be appreciated that the OTDR methods and systems described herein may equivalently apply in the case of bi-directional OTDR measurements. In this case, one or more OTDR traces are acquired from each end of the optical fiber link under test. As known in the art, an analysis of the forward and backward OTDR traces jointly provides a more reliable characterization of the loss and reflection parameters associated with events along the optical fiber link in cases where the optical fiber link comprises optical fiber segments having different Mode-Field Diameters (MFD). From such a bidirectional OTDR analysis, a list of identified events and optical fiber segments equivalent to the lists of Table 1 and Table 2 may be obtained. It is noted that bidirectional OTDR analysis may be applied to either single-pulsewidth or multi-pulsewidth acquisitions (for bidirectional multi-pulsewidth OTDR analysis, see U.S. patent application Ser. No. 14/014,606, commonly owned by applicant and hereby incorporated by reference). Once values of parameters of the events and the optical fiber segments along the optical fiber link are derived, loss and reflectance profiles may be constructed exactly as described herein.

It should be appreciated that optical fiber monitoring applications may advantageously make use of loss and reflectance profiles as described hereinabove. In order to visually appreciate variations or degradations of optical fiber links from one time to another, the loss and reflectance profiles corresponding to a given characterization may be graphically presented along with reference profiles obtained from one or more previous characterizations of the same fiber link.

Figure 8:
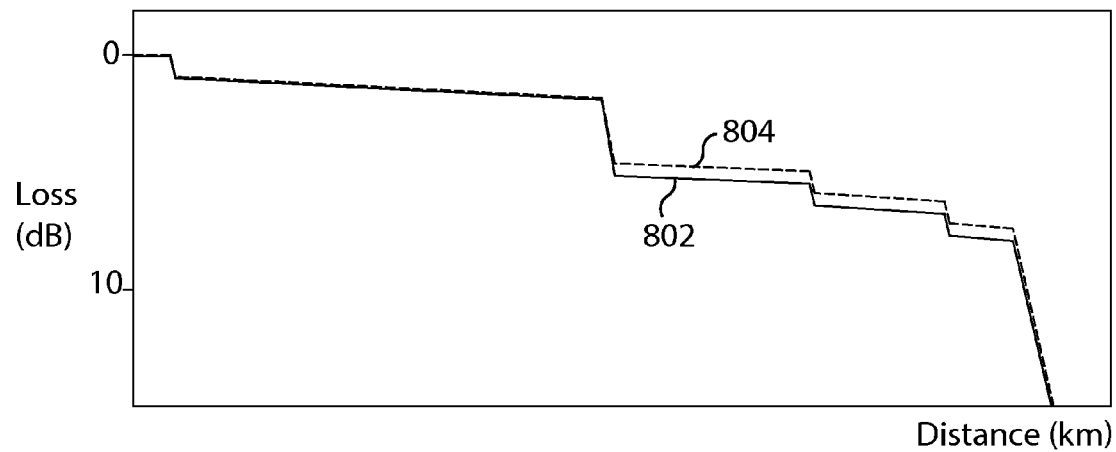
FIG. 8 is a graph illustrating a graphical representation of a loss profile (solid line) along with a reference loss profile (dashed line) for use in the context of optical fiber monitoring applications for example.
Figure 9:
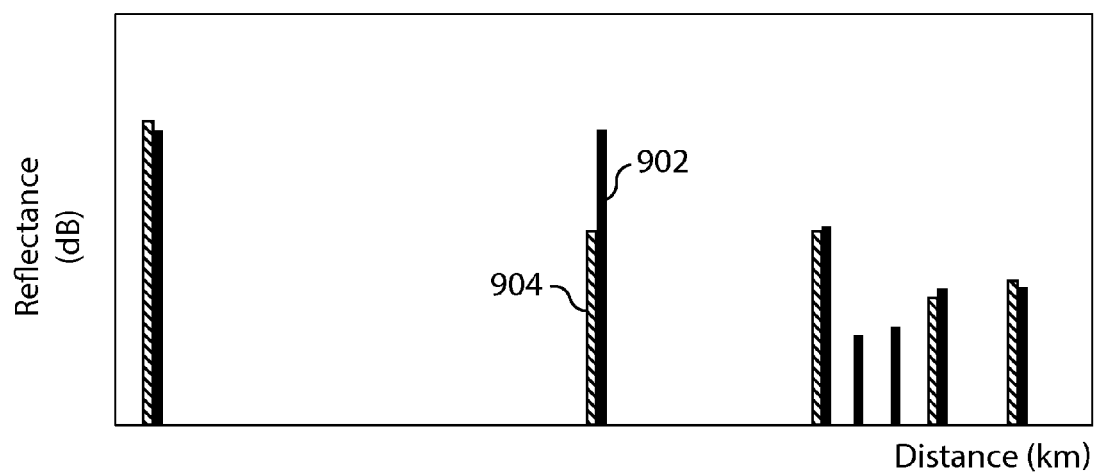
FIG. 9 is a graph illustrating a graphical representation of a reflectance profile (black solid) along with a reference reflectance profile (diagonal stripe pattern) also for use in the context of optical fiber monitoring applications for example.

FIGS. 8 and 9 illustrate the use of the loss and reflectance profiles in the context of optical fiber monitoring applications. The graphs of FIGS. 8 and 9 respectively show a loss profile 802 and a reflectance profile 902 corresponding to a given characterization of an optical fiber link, which are respectively depicted along with a respective reference loss profile 804 (FIG. 8) and reference reflectance profile 904 (FIG. 9) for comparison. The reference profiles are typically used for visually facilitating appreciation of the evolution of the loss and reflectance values on the fiber link from one or more previous acquisition(s) to the current acquisition. The origin of the reference profiles 804, 904 may vary. In one embodiment, the reference loss and reflectance profiles 804, 904 correspond to a previous characterization performed on the same optical fiber link at a given time in the past. The previous characterization serves as a baseline for identification and interpretation of any change or degradation in the optical characteristics of the fiber link. This may be helpful in both monitoring and diagnosis situations. In other embodiments, the reference loss and reflectance profiles may be obtained by averaging prior characterizations of the same fiber link as cumulated over a given period of time. For example, the reference profiles may be updated in real time as new characterizations are being performed. In yet another embodiment, the loss profile and the reflectance profile may be displayed in a persistence mode. In this case, reference loss and reflectance profiles are then created by an overlay of a number of prior characterizations of the same fiber link as cumulated over a given period of time. The persistence mode facilitates the assessment of repeatability and variability of the loss and reflectance profiles in time. In still another embodiment, reference loss and reflectance profiles may represent a minimum and/or a maximum of prior characterizations performed on the same fiber link. Of course, any combination of the above-mentioned reference profiles may also be graphically represented. Furthermore, in some cases, a plurality of optical fibers comprised within a common optical fiber cable may be characterized using one of the herein-described methods and systems. In such cases, it may be useful to graphically represent the loss or reflectance profiles corresponding to each of the optical fibers on the same graph. The loss or reflectance profiles for each of the various optical fibers in the cable may be simply overlaid on the graph. Alternatively, only the envelope corresponding to these overlaid loss or reflectance profiles may be graphically presented.

In should be appreciated that the current characterization may be performed under acquisition conditions (pulsewidths and optical powers) that are different from those under which the reference profiles 804, 904 are based. For instance, the reference profiles 804, 904 may have been characterized using different OTDR instruments, or with different launch and reference cables or from a different position on the optical fiber link. For that reason, differences in the acquired OTDR traces corresponding to the current and the reference characterizations would not be necessarily indicative of an evolution or a degradation of the optical fiber link. In addition, acquisition noise may appear on OTDR traces due to limits on the dynamic range, which can make it difficult to compare such traces. Conversely, comparison of loss and reflectance profiles is readily possible because the acquisition conditions are then left aside and because the acquisition noise is taken away by the process of constructing the loss and reflectance profiles. The loss and reflectance profiles are therefore directly indicative of the optical characteristics of the optical fiber link being characterized and the graphical representations of loss and reflectance profiles allow for an operator to efficiently appreciate the differences between the reference and current characterization at a single glance.

It should be appreciated that the methods and systems described herein may also apply to point-to-multipoint networks (e.g. a PON network, such as defined by ITU-T G.983 or ITU-T G.984). Accordingly, if the OTDR acquisitions are launched in the optical fiber that is common to the multiple optical fiber paths, each OTDR trace may then comprise events physically located on different paths (i.e. branches) of the point-to-multipoint network. In this case, the "optical fiber link" under test actually comprises a combination of optical fiber paths. It will be understood that, in this case, a location of an event identified in the OTDR traces is representative of a distance between the identified event and the OTDR acquisition device. Because each OTDR trace represents a sum of backscattered and reflected light returned from each of multiple optical fiber paths, the "backscattering segments" between events on each OTDR trace do not directly represent physical optical fiber segments. However, each backscattering segment may still be characterized by a respective slope of the backscattering light as a function of distance, although the quantitative value of this slope may be of limited diagnostic utility. A value of the backscattering slope parameter may be derived from the rate of change (in dB/km) of a least-square fit performed on a portion of the OTDR trace corresponding to the backscattering segment for which the backscattering slope parameter is evaluated. The loss profile is then constructed as described above from the loss and location parameters of each identified events and the backscattering slope parameter of each backscattering segments. The reflectance profile is also constructed as described above from the reflectance and location parameters of each identified events.

Such loss and/or reflectance profiles may be advantageously used in monitoring applications applied to point-to-multipoint networks. The loss and/or reflectance profiles together with respective reference profiles provide a visually representation of variations or degradations in time of the point-to-multipoint network. For example, a sudden fiber breakage event on one of the multiple optical fiber paths will appear as a new localized loss on the loss profile as well as, usually, a new reflection peak on the reflection profile. If, for instance, High Reflectance Demarcation (HRD) components are employed (see, for example, patent publication no. US 2012/0045205 A1 to PERRON, commonly owned by the applicant), reflectance peaks associated with the HDR component(s) at the end of the broken optical fiber path will also disappear from the reflection profile, which facilitates identification by the operator of the position of the breakage within the network.

Although illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated herein is thus only provided for efficiency of teaching the described embodiment.

The embodiments described above are intended to be exemplary only. The scope of the invention is therefore intended to be limited solely by the appended claims.

What is claimed is:

1. An optical reflectometric method for characterizing an optical fiber link comprising at least one optical fiber path, the method comprising:
    performing at least one light acquisition, wherein each light acquisition is performed by propagating at least one test light signal in the optical fiber link and detecting corresponding return light from the optical fiber link so as to obtain one or more reflectometric traces representing backscattered and reflected light as a function of distance;
    identifying at least one event in at least one of the obtained reflectometric traces;
    for each event, deriving values of parameters characterizing the event using at least one of said reflectometric traces, the parameters comprising a location of the event along the optical fiber link and loss associated with the event;
    for each of optical fiber segments in-between events, deriving a value of a parameter associated with the optical fiber segment using said at least one of said reflectometric traces, which parameter comprises attenuation associated with the optical fiber segment; and
    from the derived parameters, constructing a loss profile of the optical fiber link for graphical representation thereof, wherein the loss profile is constructed from the derived parameters of said events and the derived parameters of said optical fiber segments and excludes said reflected light;
    wherein said loss profile is graphically represented on a Cartesian graph, the abscissa of which representing the distance along the optical fiber link and the ordinate of which representing a cumulated loss/attenuation of the optical fiber link as a function of the distance therealong.

2. The optical reflectometric method as claimed in claim 1, wherein the reflectometric method is an Optical Time-Domain Reflectometric (OTDR) method and wherein each light acquisition is performed by propagating at least one test light pulse in the optical fiber link and detecting the corresponding return light from the optical fiber link as a function of time so as to obtain a reflectometric trace representing backscattered and reflected light as a function of distance on the optical fiber link.

3. The optical reflectometric method as claimed in claim 2, wherein a plurality of light acquisitions are performed with respective test light pulses having mutually different pulsewidths.

4. The optical reflectometric method as claimed in claim 1, wherein said loss profile comprises a loss associated with a first event that is derived from a first reflectometric trace obtained with a first pulsewidth and a loss associated with a second event that is derived from a second reflectometric trace obtained with a second pulsewidth different from said first pulsewidth.

5. The optical reflectometric method as claimed in claim 3, wherein a first one of said parameters of said event is derived from a first reflectometric trace obtained with a first pulsewidth; and a second one of said parameters of said event is derived from a second reflectometric trace obtained with a second pulsewidth different from said first pulsewidth.

6. The optical reflectometric method as claimed in claim 1, wherein said at least one optical fiber link comprises a point-to-multipoint network and wherein events are interleaved with backscattering segments on said reflectometric traces.

7. The optical reflectometric method as claimed in claim 6, further comprising:
for each of said backscattering segments, deriving a value of a parameter characterizing the backscattering segment using at least one of said reflectometric traces, which parameter comprises a backscattering slope associated with the backscattering segment; and
wherein the loss profile of said point-to-multipoint network is constructed from the derived parameters of said at least one event and said backscattering segments.

8. The optical reflectometric method as claimed in claim 1, further comprises constructing a reflectance profile representing localized reflectance values and wherein said method further comprises graphically representing said reflectance profile on a further Cartesian graph, the ordinate of which representing reflectance values; wherein said ordinate is apportioned into at least a pass zone and a fail zone according to a predetermined threshold applicable to reflectance values.

9. The optical reflectometric method as claimed in claim 1, wherein said ordinate of said Cartesian graph is apportioned into at least a pass zone and a fail zone according to at least one predetermined threshold applicable to cumulated loss/attenuation values.

10. The optical reflectometric method as claimed in claim 8, further comprising producing a graphical representation comprising said reflectance profile and a corresponding reference reflectance profile.

11. The optical reflectometric method as claimed in claim 10, wherein said corresponding reference reflectance profile is representative of localized reflectance values of said optical fiber link as a function of distance thereon, as obtained from at least one prior characterization of said optical fiber link.

12. The optical reflectometric method as claimed in claim 10, wherein said corresponding reference reflectance profile is representative of localized reflectance values of said optical fiber link as a function of distance thereon, as obtained from an average of prior characterizations of said optical fiber link and wherein said reference reflectance profile is updated in time as characterizations are being performed.

13. The optical reflectometric method as claimed in claim 1, comprising producing a graphical representation comprising said loss profile and a corresponding reference loss profile.

14. The optical reflectometric method as claimed in claim 13, wherein said corresponding reference loss profile is representative of cumulated loss/attenuation of said optical fiber link as a function of distance thereon, as obtained from at least one prior characterization of said optical fiber link.

15. The optical reflectometric method as claimed in claim 13, wherein said reference loss profile is representative of cumulated loss/attenuation of said optical fiber link as a function of distance thereon, as obtained from an average of prior characterizations of said optical fiber link and wherein said reference loss profile is updated in time as characterizations are being performed.

16. The optical reflectometric method as claimed in claim 1, wherein a plurality of light acquisitions are performed with respective test light pulses having mutually different wavelengths and producing a graphical representation comprising at least one of a loss profile and a reflectance profile for at least two of said wavelengths.

17. An optical reflectometric system for characterizing an optical fiber link comprising at least one optical fiber path, the system comprising:
a light generating assembly for generating and propagating at least one test light signal in the optical fiber link;
a detection assembly for detecting return light from the optical fiber link for each test light signal so as to obtain one or more reflectometric traces representing backscattered and reflected light as a function of distance;
an analyzing module for analyzing at least one of said reflectometric traces to identify therein at least one event, to derive, for each event, values of parameters characterizing the event, the parameters comprising a location of the event along the optical fiber link and a loss associated with the event and to derive, for each of optical fiber segments in-between events, a value of a parameter associated with the optical fiber segment using said at least one of said reflectometric traces, which parameter comprises attenuation associated with the optical fiber segment; and
a profile generating module for constructing, from the derived parameters, a loss profile of the optical fiber link, for graphical representation thereof, wherein the loss profile is constructed from the derived parameters of said events and the derived parameters of said optical fiber segments and excludes said reflected light;
wherein said loss profile is graphically represented on a Cartesian graph, the abscissa of which representing the distance along the optical fiber link and the ordinate of which representing a cumulated loss/attenuation of the optical fiber link as a function of the distance therealong.

18. The optical reflectometric system as claimed in claim 17, wherein the reflectometric system is an Optical Time-Domain Reflectometer (OTDR), wherein said light generating assembly is for generating and propagating at least one test light pulse in the optical fiber link, and wherein said detection assembly is for detecting the corresponding return light from the optical fiber link as a function of time so as to obtain a reflectometric trace representing backscattered and reflected light as a function of distance on the optical fiber link.

19. The optical reflectometric system as claimed in claim 18, wherein said light generating assembly is adapted to generate test light pulses having mutually different pulsewidths to obtain a plurality of light acquisitions performed with respective test light pulses having mutually different pulsewidths.

20. The optical reflectometric system as claimed in claim 17, wherein said loss profile comprises a loss associated with a first event that is derived from a first reflectometric trace obtained with a first pulsewidth; and a loss associated with a second event that is derived from a second reflectometric trace obtained with a second pulsewidth different from said first pulsewidth.

21. The optical reflectometric system as claimed in claim 19, wherein a first one of said parameters of said event is derived from a first reflectometric trace obtained with a first pulsewidth; and a second one of said parameters of said event is derived from a second reflectometric trace obtained with a second pulsewidth different from said first pulsewidth.

22. The optical reflectometric system as claimed in claim 17, wherein said optical fiber link comprises a point-to-multipoint network and wherein events are interleaved with backscattering segments on said reflectometric traces.

23. The optical reflectometric system as claimed in claim 22, wherein said analyzing module is further for deriving, for each of said backscattering segments, a value of a parameter characterizing the backscattering segment using at least one of said reflectometric traces, which parameter comprises a backscattering slope associated with the backscattering segment, and wherein said profile generating module is adapted for construction the loss profile of said point-to-multipoint network at least from the derived parameters of said at least one event and said backscattering segments.

24. The optical reflectometric system as claimed in claim 17, wherein said profile generating module is further adapted for constructing a graphical representation of a reflectance profile representing localized reflectance values on a further Cartesian graph, the ordinate of which representing reflectance values; wherein said ordinate is apportioned into at least a pass zone and a fail zone according to at least one predetermined threshold applicable to reflectance values.

25. The optical reflectometric system as claimed in claim 17, wherein said ordinate of said Cartesian graph is apportioned into at least a pass zone and a fail zone according to at least one predetermined threshold applicable to cumulated loss/attenuation values.

26. The optical reflectometric method as claimed in claim 1, wherein a reflectance profile is further constructed and represents localized reflectance values on the optical fiber link as a function of distance.

27. The optical reflectometric system as claimed in claim 17, wherein a reflectance profile is further constructed by the profile generating module, and represents localized reflectance values on the optical fiber link as a function of distance.

\* \* \* \* \*